United States Patent [19]

Eau Claire

[11] 3,865,355

[45] Feb. 11, 1975

[54] MEANS FOR PUTTING ADDITIVE IN PLASTIC AND OTHER MATERIALS

[76] Inventor: Thomas J. Eau Claire, 4181 Richmark Ln., Bay City, Mich. 48706

[22] Filed: Apr. 23, 1973

[21] Appl. No.: 353,819

[52] U.S. Cl. ................................ 259/192, 259/21
[51] Int. Cl. .............................................. B01f 7/08
[58] Field of Search ........... 259/191, 192, 193, 5, 6, 259/9, 10, 21, 64; 264/75, 349; 425/131

[56] References Cited
UNITED STATES PATENTS

| | | | |
|---|---|---|---|
| 2,059,435 | 11/1936 | Brownlee | 259/5 |
| 2,103,546 | 12/1937 | Morrell | 264/75 |
| 2,803,041 | 8/1957 | Hill | 264/75 |
| 3,261,056 | 7/1966 | Fritsch | 259/192 |
| 3,746,315 | 7/1973 | Rizzi et al. | 259/192 |

*Primary Examiner*—Robert W. Jenkins

[57] ABSTRACT

Additive for plastic material and others being screw extruded, such as colorant, anti-oxidant and the like, is auger fed through the sidewall of the feed hopper just above the screw with the auger feed tube hooded by the upper side extending beyond the lower side and with the lower side terminating at a point in a range of distance along an approximately horizontal line extending from the in-feed sidewall, i.e., the sidewall where the auger feed tube penetrates, and substantially passing through the vertical axis of the feed hopper, and, at a distance from said axis towards said in-feed sidewall equal to about one-seventh the diameter of the hopper at that level to a distance from said axis away from said in-feed sidewall equal to about one-tenth diameter, but preferably within a distance from about one-ninth diameter from the axis towards the in-feed sidewall to about one-fifteenth diameter beyond said axis, and most preferably between the said axis and about one-twelfth diameter therefrom toward the in-feed sidewall. Two or three auger tubes that substantially meet at a common point may be used to add a like number of additives simultaneously. Each hooded end may have any of various shapes from flat bevelled to arcuate to stepped. The motor drive for the screw extruder and the variable speed motor drive of the auger tube or tubes are controlled from a common electrical or other control device switch for coordinate proportional addition of additive.

The present apparatus and method are also suitable for mixing of particulate materials on omitting of the extrusion die end portion of the screw extruder so as to thus simply delivering mixed composition from the end of the screw feed device.

11 Claims, 7 Drawing Figures

MEANS FOR PUTTING ADDITIVE IN PLASTIC AND OTHER MATERIALS

BACKGROUND OF THE INVENTION

1. Field of the Invention

The present invention relates to an apparatus and a method for incorporating additive into plastic and other material in the feed hopper of a screw extruder or the like appliance in the process of making uniformly and evenly colored extruded thermoplastic product. The invention also relates to a method and apparatus for intimately mixing particulate materials in general.

2. Description of the Prior Art

Heretofore colorants and other additives have usually been added to plastic material being screw extruded by prior tumbling or shaking in a separate operation or by utilizing a gravity feed system for both the feed material and the additive. Serious problems have been encountered, since there is a tendency for too little of the additive to stick to non-porous plastic surfaces as a consequence of tumbling, or, in any event, to mix efficaciously well and uniformly with the material being compounded. In the case of the gravity feed system, the uniformity of feed is difficult to assure and difficulties are encountered with and at the delivery end of the additive tube due to plugging of the tube end if it is not directed substantially vertically downward.

OBJECTS OF THE INVENTION

Amongst the principal objects of the invention are to provide method and apparatus for obtaining greater uniformity of blend of additive in a reproducible manner with compact, easily controlled apparatus, and with the capability of adding several additives simultaneously in the production of uniformly, rather than marbleized, colored or other blended plastic or other material. Another object of the invention is to provide method and apparatus for any material being compounded which avoids having to run out or throw away a large quantity of mix in the hopper after perceiving a need to change the additive ratio.

SUMMARY OF THE INVENTION

It has now been discovered that, upon introducing at least one additive into plastic or other feed material to be screw extruded or handled, it is possible to achieve the objectives hereof by bringing the at least one additive into the feed hopper by means of at least one auger feed tube extending substantially horizontally through the lower part of the sidewall of the feed hopper above and adjacent to the screw of the extruder, the distal end of the auger feed tube being hooded, i.e., the top side extending beyond the lower side, and the lower side of the auger feed tube terminating at a point in a range of distance along an approximately horizontal line extending from the in-feed sidewall of the feed hopper where the auger feed tube penetrates and substantially passes through the vertical axis of the feed hopper and, at a distance from said axis towards said in-feed sidewall equal to about one-seventh the diameter of the feed hopper at the auger feed tube level to a distance from said axis away from said in-feed sidewall equal to about one-tenth diameter and more preferably about one-ninth and one-fifteenth diameters, respectively. The screw extruded or otherwise handled material resulting therefrom is uniformly blended with the additive material and problems of additive tube clogging are avoided. This is particularly important in the case when plastics, especially thermoplastics, are being handled. Preferably, the auger and the screw are operated with a common switch or control device assuring coordination of operation and highly reproducible blending from batch to batch and throughout a batch or run of product. As mentioned, upon omission of the extrusion die end of the screw extruder, there is then provided apparatus capable of thoroughly admixing particulate materials.

SUMMARY DESCRIPTION OF THE DRAWINGS

FIG. 7 is a fragmentary view in section of the delivery end of apparatus as in FIG. 1, but with the extrusion die omitted so that the apparatus of FIG. 1, modified as in FIG. 7, is useful for general blending and mixing operations above and beyond plastic extrusion.

PARTICULARIZED DESCRIPTION OF THE INVENTION

The apparatus and method of the present invention and advantageously used and employed to blend and extrude plastic, especially thermoplastic, material with additive components therefor in most any screw extruder for plastics or the like. The extrudable plastic materials include, but are not limited to, cellulose esters, such as cellulose acetate, cellulose propionate, cellulose butyrate, cellulose nitrate, cellulose acetate-butyrate or cellulose acetate-propionate; cellulose ethers, such as ethyl cellulose or benzyl cellulose; extrudable polyamides such as the nylons; polyesters such as polyethylene adipate or polyethylene terephthalate; resinous vinylidene polymers such as polymers of methyl methacrylate or ethyl methacrylate; styrene polymers and copolymers and rubber or otherwise reinforced and chemically modified polymers and copolymers (such as high impact polystyrene and/or ABS, etc.) of styrene or its derivates; vinyl chloride polymers, vinyl acetate polymers, copolymers of vinyl acetate and vinyl chloride, and polymers and copolymers of vinylidene chloride, and so forth as all appears to those skilled in the art.

Additive material for the purpose of the following description and the hereto appended claims includes any of the solid or even semi-solid particulate modifying agents commonly blended with plastic materials before or during screw extrusion and includes, but is not limited to, plasticizers, antioxidants, lubricants, pigments, dyes, etc.

In addition as is herein evident, particularly in connection with consideration of the description and exemplification of FIG. 7, many other materials can advantageously and with great benefit be mixed and blended in practice of the present invention especially when the end result is not necessary to be extruded through a die. These are above and beyond plastic and thermoplastic materials of the usually understood sorts of same in any case where any additament for any purpose is desired to be added and uniformly blended with the bulk of the material being processed. For example, practice of the present invention can advantageously be utilized in handling ground or whole grain products (such as wheat, corn, rye, etc.) when it is desired to admix therewith various additive materials such as vitamin or feed supplements and/or other desirable components. As a matter of fact, in any such operation, the desired additive can be added to the whole grain product before subsequent grinding or mashing of the entire composition for the final intended use. Likewise, other food composition such as flour admixtures for cake and bread mixes and the like can be so treated; as well as many other particulate materials that need to be thoroughly mixed and blended with desired additaments therefor such as processing of glass frit (usually requiring at least colorants), fertilizers, cement and other rock and stone mixtures, and so forth.

Figure 1:
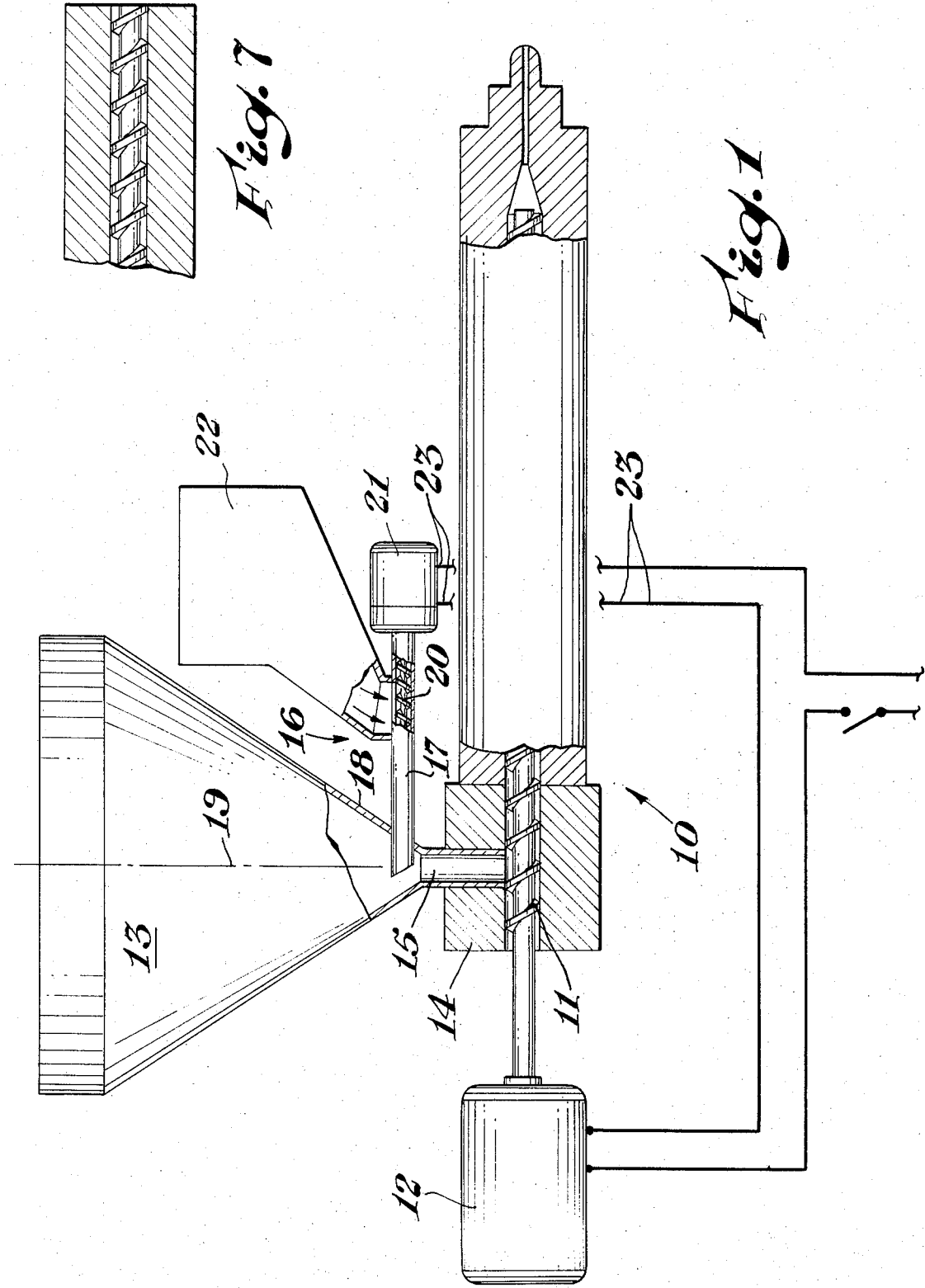
FIG. 1 is a view in side elevation partly broken away and in section which schematically shows a screw extruder and feed hopper and an auger feed tube extending into the feed hopper in accordance with the present invention.
Figure 2:
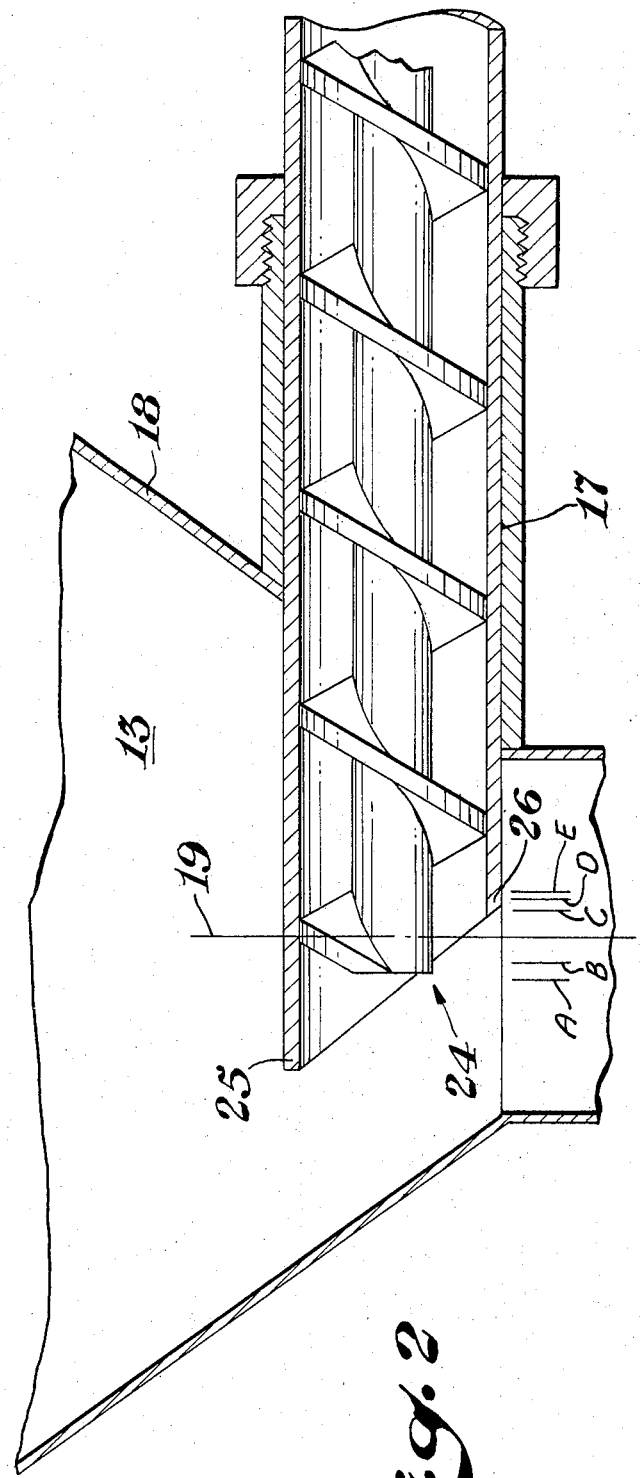
FIG. 2 is a fragmentary portion of an enlarged view of FIG. 1 showing the detail of the hooded distal end of the auger feed tube and the position of the distal end with respect to the vertical axis of the feed hopper.

Referring now to FIGS. 1 and 2, wherein an embodiment according to the invention is illustrated, the apparatus is seen to include a common or any desired type of screw extruder which is indicated generally by the reference numeral 10. The extruder 10 has a screw feed mechanism 11 driven by electric motor drive 12 or any other suitable motor drive such as a hydraulic motor. The extruder receives either virgin or regrind or reclaim particulate plastic, especially thermoplastic, material from a feed hopper 13 which is positioned above the inlet head 14 or block of the extruder and connected to the inlet port thereof by the hopper base 15. The hopper base 15 here is simply a foreshortened cylindrical conduit.

Positioned above the screw extruder is the apparatus, indicated generally by the reference numeral 16, introducing additive material into the feed hopper 13. Apparatus 16 includes an auger feed tube 17 which extends substantially horizontally through the lower part of the sidewall 18 of the feed hopper 13 and terminates adjacent and above the screw 11 above the hopper base 15 and closely adjacent the vertical axis 19 of the feed hopper 13. The auger 20 of the auger feed tube 17 is driven by a variable speed motor drive, such as electric motor, 21. If desired, a vibratory device (not shown) may be attached to auger feed tube 17 to aid in uniform delivery of additive.

Additive is fed into the auger 17 from a hopper and integral base 22. Operation of the motor drives 12 and 21 are preferably coordinated as by connecting the two motors to electric power with a common switch, e.g., as by connecting the motors in series, as shown, with electric wires or leads 23.

Motor drives 12 and 21 may each be any of an electric motor, a hydraulic motor or a pneumatic motor. If both motors are hydraulic, then electric wires 23 are hydraulic lines connected to a reservoir and pump (not shown). If both motors are pneumatic, then electric leads 23 will have to be pneumatic lines or conduits, connected to a pressure tank and pump (not shown). If the two motors differ in nature, then and quite obviously, appropriate wires or lines in place of electric wires 23 will have to supply each with a means of power.

In any event, it is much to be preferred to control both motor drives 12 and 21 with a common switch or device whereby both motor drives are operated or stopped simultaneously. It is also preferred to utilize motor drives on which one can make adjustments in relative operating speeds as by changing motor speed and/or gear reduction whereby the relative ratio of plastic or other material to additive being handled can be periodically adjusted. Such ratio is generally unaffected by the operation of the common switch or control device, and it merely simply and fundamentally assures simultaneous operation of both motor drives.

Referring more specifically to FIG. 2, the auger feed tube 17 is seen to terminate at its distal end, indicated generally by reference numeral 24, in a hooded configuration, i.e., with the upper side 25 of the end extending beyond the lower side 26, to avoid plastic or other material in the feed hopper 13 clogging the end 24 of the auger feed tube as the plastic material feeds by gravity down to the hopper base 15 and into the screw 11 of the screw extruder.

Particularly fine uniformity of blending of the additive material with the plastic or other material is obtained upon positioning the distal end 24 of the auger feed tube 17 closely adjacent the vertical axis 19 of the feed hopper 13, so as to deliver additive material from the auger feed tube 17 at a point or zone close to the vertical axis 19. It has been discovered that most of the particulate material, because of marked laminar flow tendencies, moves through a rather limited zone around the vertical axis of the hopper, especially in the throat and base of the hopper. Thus, it is believed to be essential to good, efficient mixing to position the distal end 24, i.e., the delivery end of the auger feed tube 21, so as to deliver additive into this limited zone.

This is well accomplished by locating the distal end a little short of the exact desired location, since delivered additive material will generally be projected a bit beyond the distal end. Thus, the auger feed tube 17 terminates with the lower side 26 thereof at a point along a line extending approximately horizontally from the in-feed side of the sidewall 18 of the feed hopper 13.

Accordingly, at the approximate point where the auger feed tube 17 extends through the sidewall 18, the line substantially passing through the vertical axis 19 of the feed hopper 13 and the termination point of the lower side 26 of the auger feed tube 17 should be within the range of a distance from said axis 19 and towards the in-feed sidewall 18 equal to between about one-seventh of the diameter of the hopper at the auger feed tube level to a distance from said axis away from said in-feed sidewall equal to about one-tenth of the diameter; more preferably between about one-ninth and one-fifteenth diameters, respectively; and most preferably between the vertical axis and about one-twelfth of the diameter distance in the direction of the in-feed sidewall.

The positioning of the lower side 26 of the end 24 of the auger feed tube 17 will be better understood with reference to the slightly enlarged view set forth in FIG.

2 of the Drawing. The lower side 26 terminates within the zone between lines A and E of this FIGURE. Line E is a substantially vertical line located at a distance about one-seventh of the diameter of the hopper section from the vertical axis 19 and in the direction of the in-feed sidewall 18. The diameter referred to is the hopper section diameter at the level of the auger feed tube 17. Line A is located about one-tenth of the diameter beyond the vertical axis 19 in the direction away from the in-feed sidewall 18.

Preferably the lower side 26 of the auger feed tube 17 terminates within the zone between lines B and D. Line D is located at a distance of about one-ninth of the diameter from the vertical axis and towards the in-feed sidewall 18 while line B is located about one-fifteenth of the diameter beyond the vertical axis 19 in the opposite direction.

Most preferably the lower side 26 of the auger feed tube 17 terminates between line C and the vertical axis 19. Line C is located about one-twelfth of the diameter from the vertical axis 19 and in the direction of the in-feed sidewall 18.

Figure 4:
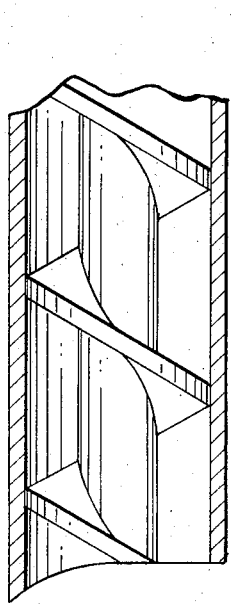
FIGS. 3 and 4 are fragmentary views of distal ends of auger tubes with other forms of hood shape, i.e., extension of the upper side over the lower side.
Figure 3:
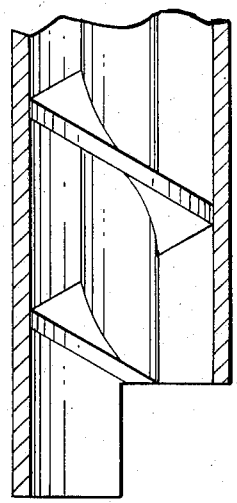

If desired, the hooded distal end 24 of the auger feed tube 17 may be shaped in stepped fashion as shown in the fragmentary view illustrated in FIG. 3. Alternatively, it may be concave as is shown in the fragmentary view of FIG. 4, so as to be capable of receiving a curvilinear, non-planar surface transversely thereacross.

The present apparatus is capable of adding and thoroughly and uniformly blending most any proportion of additive to the plastic or other material ranging up to about 10 or even 100 or so to 1, plastic to additive and even greater; although most additions are made in proportions of additive below about one part additive to about 25 to 50 parts plastic or other material.

The present invention also contemplates the use of a plurality of auger feed tubes for the simultaneous addition of different types of additive, such as, e.g., a plasticizer, an anti-oxidant, and a pigment, or, the simultaneous addition of a plurality of different colorants such as pigments and/or dyes, or whatever other additaments may be involved. The auger feed tubes may be two in number and generally will not exceed three, even though there is no limit to this as the exigencies of any given situation may dictate.

Figure 6:
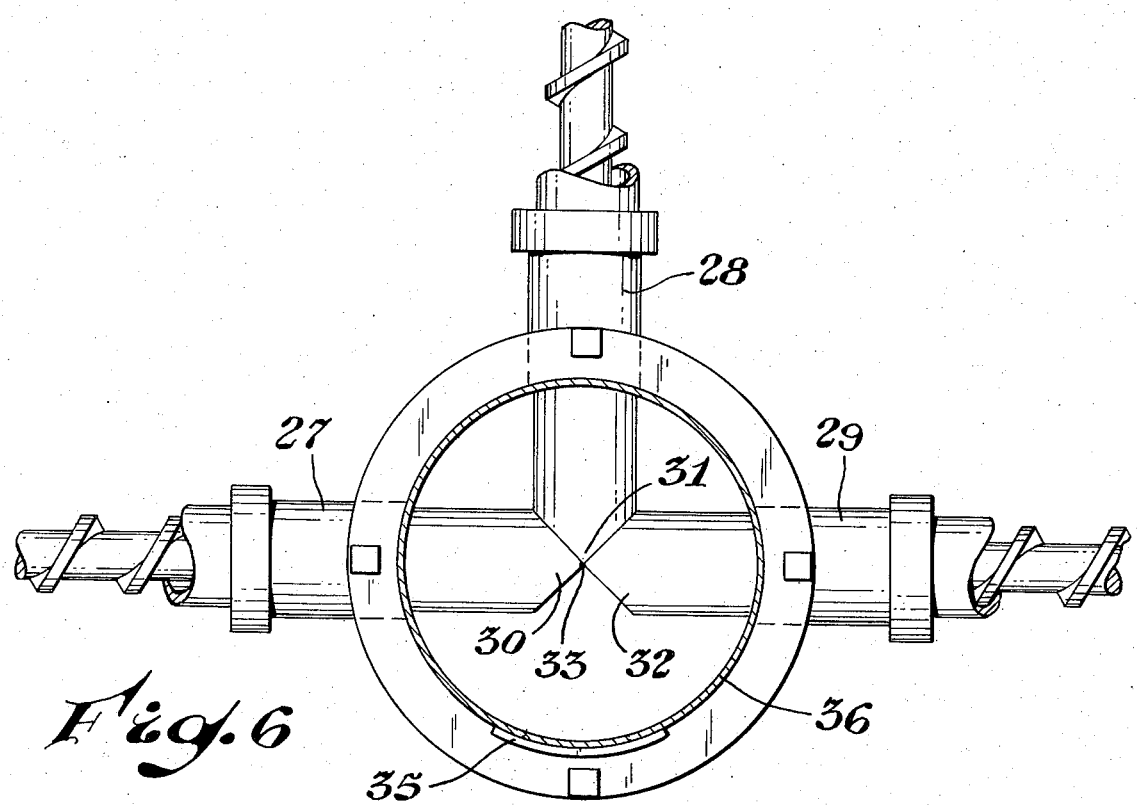
FIG. 6 is a top view of the juncture of the three auger feed tubes, the view being in section taken along line 6—6 of FIG. 5.
Figure 5:
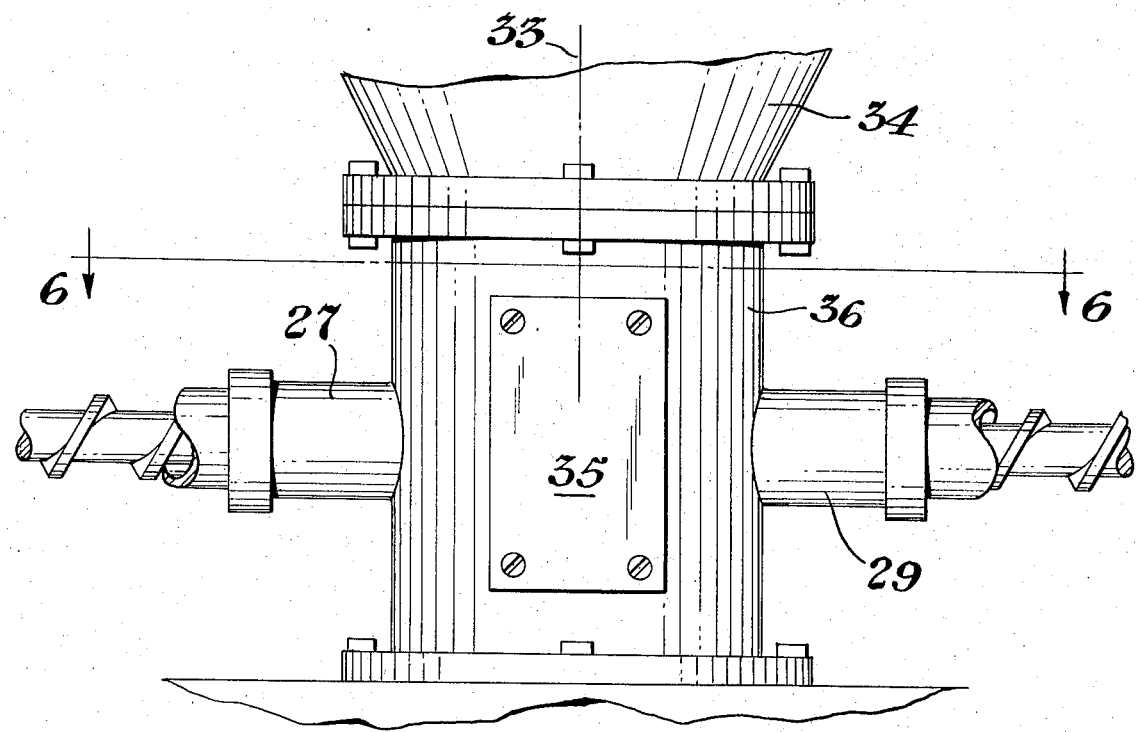
FIG. 5 is a fragmentary view in side elevation of an embodiment of the invention in which three auger tubes are utilized to feed three streams of additives simultaneously into the feed hopper.

The fragmentary views shown in FIGS. 5 and 6 illustrate a portion of an embodiment of the invention in which there are utilized three auger feed tubes 27, 28 and 29 which meet concisely at their distal ends 30, 31 and 32 adjacent the vertical axis 33 of the feed hopper 34, although the horizontal spacing from the vertical axis may be from about one-seventh to one-ninth of the diameter of the adapter 36, and more preferably no more than one-twelfth of the diameter from said axis. The distal ends are serviced readily through the clean out opening 35 in the sidewall of the hopper base.

The augers in each tube are supplied additive by respective hoppers (not shown) and driven by respective drive motors (not shown). The auger feed tubes 27, 28 and 29 are positioned so as to extend substantially horizontally through the sidewall of the cylindrical shell shaped adapter or base 36 of the feed hopper 34. The distal ends 30, 31, 32 of the auger feed tubes 27, 28, 29 deliver additive slightly above and closely adjacent the screw (not shown) of the screw extruder, the screw being immediately below the hopper base 36 and accessible therefrom. Preferably each drive motor for the auger feed tubes is controlled in common with the drive motor for the screw extruder or with a common switch or device to assure coordinate feeding of additive with feeding and extrusion of plastic material so as to reproducibly an consistently add the predetermined amount, i.e., proportion of additive.

Upon omitting the extrusion die end portion of the screw extruder shown in FIG. 1 so that the delivery end is similar to that shown in the fragmentary view of FIG. 7, there is provided, according to the invention, apparatus for thoroughly, uniformly and reproducibly blending together most any combination of particulate material that can, respectively, be fed uniformly through the feed hopper 13 and through the screw feed device 16. In operations according to the invention it must be understood that the main screw extrusion or feed device is an essential element in mixing and blending operations upon the materials fed thereinto according to the special apparatus and method of the invention.

Many changes and modifications can readily be made and adapted in embodiments in accordance with the present invention without substantially departing from its apparent and intended spirit and scope, all in pursuance and accordance with same as is set forth and defined in the hereto appended claims.

What is claimed is:

1. A screw extruder for homogeneously mixing and extruding a thermoplastic material with an additive material including:
   a feed hopper for feeding thermoplastic material to the screw extruder;
   at least one auger feed tube for feeding additive material into the feed hopper;
   said at least one auger feed tube extending substantially horizontally through the lower part of the sidewall of the feed hopper above and adjacent to the screw of the extruder;
   the upper side of said at least one auger feed tube at its distal end extending beyond the lower side thereof and said lower side terminating along a line extending approximately horizontally along said lower side and substantially passing through the vertical axis of said feed hopper;
   the point of termination of said at least one auger feed tube being between a distance from said axis towards the in-feed sidewall equal to about one-seventh of the diameter of the feed passage in said hopper to a distance beyond said vertical axis equal and about one-tenth of said diameter in a direction away from said in-feed sidewall;
   said diameter being the diameter of the hopper section at the level of the auger feed tube.

2. The apparatus of claim 1, wherein:
   the auger feed tube terminates at a point between a a distance of from about one-ninth of said diameter from the vertical axis in the direction of the in-feed sidewall to about one-fifteenth of said diameter beyond said axis in the opposite direction from the in-feed sidewall.

3. The apparatus of claim 1, wherein:
   the auger feed tube terminates at a point between about said vertical axis and a distance about one-twelfth of said diameter towards the in-feed sidewall.

4. The apparatus of claim 1, wherein:

the distal end of the auger feed tube is uniformly beveled along a plane that extends at an angle of greater than 90° to the axis of the auger feed tube.

5. The apparatus of claim 1, wherein:
the distal end of the auger feed tube is shaped to receive a non-planar surface transversely across the end of the said tube.

6. The apparatus of claim 1, wherein:
the extending upper side of the distal end is stepped over the lower side.

7. The apparatus of claim 1, wherein:
the number of auger feed tubes is one (1).

8. The apparatus of claim 1, wherein:
the number of auger feed tubes is two or three and the distal ends thereof substantially meet at a common point.

9. The apparatus of claim 1, wherein:
the screw extruder and the at least one (1) auger feed tube are each provided with drive motor and each motor is controlled from a single common control device whereby;
each drive motor is operated simultaneously.

10. In a screw extruder fr the homogeneous mixing and extruding of a thermoplastic material with an additive material, the screw extruder having a feed hopper positioned above and feeding the screw extrusion apparatus, the improvements which comprise, in combination:
   a. adding the additive material from a screw feed device, the auger feed tube of which extends substantially horizontally through the sidewall of the feed hopper above and adjacent the inlet of the screw extrusion apparatus;
   b. said auger feed tube terminating in a hooded distal end having the upper side projecting further than the lower side, and
   c. the lower side of said distal end terminating at a point along a line extending approximately horizontally from said lower side and substantially passing through the vertical axis of the feed hopper, the point of termination being between a distance, from said axis towards the in-feed sidewall of the hopper equal to about one-seventh of the diameter, to a distance beyond said vertical axis equal to about one-tenth of the diameter in a direction away from said in-feed sidewall; said diameter being the diameter of the hopper section at the level of the auger feed tube.

11. A device for blending and mixing particulate materials which comprises:
a hopper and first screw feed device; said hopper being positioned above and feeding the intake port of the first screw feed device;
a second screw feed device having an auger feed tube adapted to deliver particulate material therefrom;
said auger feed tube extending substantially horizontally through the sidewall of said hopper and terminating above and adjacent the said intake port;
the distal end of said auger feed tube having the upper side thereof projecting beyond the lower side with said lower side terminating along an approximately horizontal line extending along said lower side and substantially passing through the vertical axis of the hopper; said point of termination being between a distance, from said axis towards the in-feed sidewall of the hopper equal to about one-seventh of said diameter to a distance beyond said vertical axis equal to about one-tenth of said diameter in a direction away from said in-feed sidewall;
said diameter being the diameter of the hopper section at the level of the auger feed tube.

* * * * *